United States Patent [19]

Iwaki

[11] Patent Number: 4,591,278
[45] Date of Patent: May 27, 1986

[54] WATERPROOF BALL BEARING DEVICE

[75] Inventor: Yoshiyuki Iwaki, Himeji, Japan

[73] Assignee: Mitsubishi Denki Kabushiki Kaisha, Tokyo, Japan

[21] Appl. No.: 635,271

[22] Filed: Jul. 27, 1984

[30] Foreign Application Priority Data

Jul. 30, 1983 [JP] Japan ............................ 58-119042
Jul. 30, 1983 [JP] Japan ............................ 58-119043

[51] Int. Cl.⁴ ........................ F16C 13/02; F16J 15/16
[52] U.S. Cl. .................................... 384/480; 277/56
[58] Field of Search ............... 384/480, 478, 477, 144, 384/135; 277/56, 25, 212 C, 212 R, DIG. 4, 67, 68, 69, 53, 55

[56] References Cited

U.S. PATENT DOCUMENTS

| 1,904,258 | 4/1933 | Wistrand | 277/67 X |
| 2,856,208 | 10/1958 | Cobb | 277/53 |
| 3,627,390 | 12/1971 | Irwin | 384/478 |
| 4,277,114 | 7/1981 | Lindegger | 384/144 |

Primary Examiner—John M. Jillions
Assistant Examiner—Lynn M. Sohacki
Attorney, Agent, or Firm—Oblon, Fisher, Spivak, McClelland & Maier

[57] ABSTRACT

A waterproof ball bearing device comprises an inner ring, an outer ring arranged coaxially with the inner ring, a plurality of balls held between the inner and outer rings, rubber-sealing plates placed at both sides of the balls to cover openings formed between the inner and outer rings, wherein at least one of the rubber-sealing plates is provided with an annular projection in a cylindrical form extending from the outer surface along the center axis of the inner and outer rings.

2 Claims, 9 Drawing Figures

4,591,278

WATERPROOF BALL BEARING DEVICE

BACKGROUND OF THE INVENTION

1. Field of the Invention

The present invention relates to a ball bearing device for supporting a rotary shaft of a rotating machine such as a generator for cars. More particularly, it relates to a ball bearing device to improve waterproof property of the bearing part.

2. Description of the Prior Art

FIGS. 1 to 3 show a typical generator for cars and a conventional waterproof ball bearing device applied to such generator, in which a reference numeral 1 designates a stator of an a.c. generator; a numeral 2 designates a rotor; a numeral 3 designates a front bracket integrally attached to the stator; and a numeral 4 designates a ball bearing mounted on the rotary shaft 7. The ball bearing 4 comprises an inner ring 41, an outer ring 42, a plurality of balls 43 held between the both rings and rubber-sealing plates 44a, 44b for sealing both sides of the balls 43. The rubber-sealing plates 44a, 44b have their one ends connected to the outer ring 42 without any gap and their other ends extending to the inner ring 41 with a space of gap or being in contact with it under a slight pressure. A numeral 5 designates a retainer fixed integrally to the front bracket 3 to support the bearing 4; numerals 8a, 8b designate spacers mounted on a rotary shaft 7, the former 8a being interposed between the rotor 2 and the bearing 4 and the latter 8b being interposed between a pulley 9 and the bearing 4. Between the bearing 4 and each of the spacers, sealing means 6, 6 made of metal are respectively interposed to cover the end of the each of the rubber-sealing plates 44a, 44b at the side of the inner ring 41 to thereby improve waterproof property of the bearing.

In the a.c. generator for cars having a bearing constructed as above-mentioned, water invades the bearing 4 through the gap between the front bracket 3 and the retainer 5 as shown by an arrow mark a to deteriorate a lubricating agent in the bearing whereby the life time of the bearing is shortened.

SUMMARY OF THE INVENTION

It is an object of the present invention to provide a waterproof ball bearing device preventing entrance of water into the bearing and enabling the prolong the life time of the bearing.

It is another object of the present invention to provide a waterproof ball bearing device having excellent waterproof property by forming an annular projection in a cylindrical form integrally with a rubber-sealing plate which covers an annular opening formed between inner and outer rings of the bearing.

It is still another object of the present invention to provide a waterproof bearing device having excellent waterproof property by constructing it in such a manner that an annular projection in a cylindrical form is formed integrally with a rubber-sealing plate and a sealing means is mounted on a rotary shaft so that the outer circumferential part of the sealing means faces the inner circumferential part of the annular projection with a small gap.

The foregoing and the other objects of the present invention have been attained by a waterproof ball bearing device which comprises an inner ring, an outer ring arranged coaxially with the inner ring, a plurality of balls held between the inner and outer rings, rubber-sealing plates placed at both sides of the balls to cover openings formed between the inner and outer rings, wherein at least one of the rubber-sealing plates is provided with an annular projection in a cylindrical form extending from its outer surface along the center axis of the inner outer rings.

BRIEF DESCRIPTION OF DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
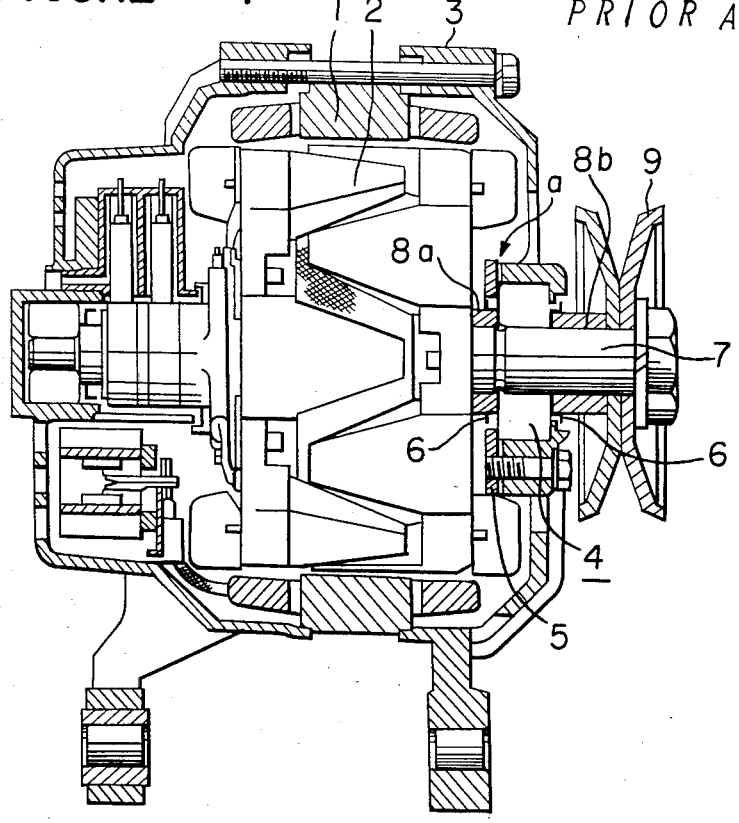
FIG. 1 is a cross-sectional view diagramatically showing a conventional generator for cars.

Description will be made as to embodiments of the ball bearing of the present invention where it is applied to a generator for cars, with reference to the drawings. In the drawings, the same reference numerals designate the same or corresponding parts.

Figure 2:
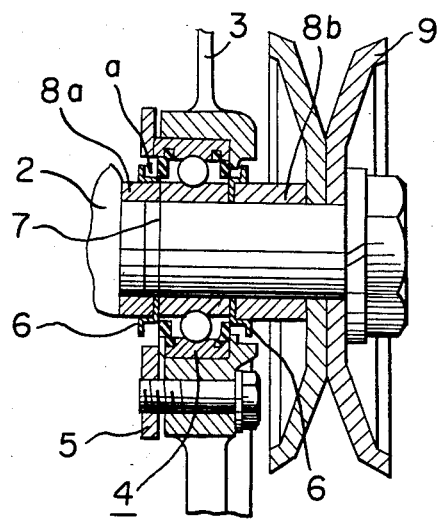
FIG. 2 is an enlarged cross-sectional view of a part of the generator with a conventional ball bearing device.
Figure 3:
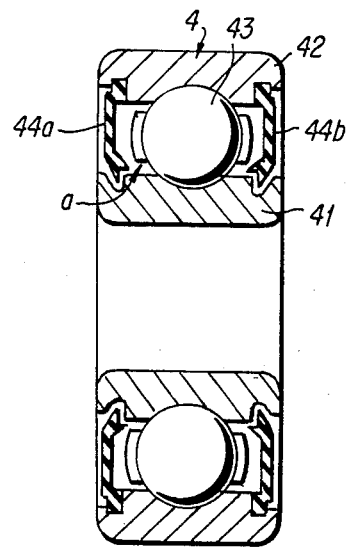
FIG. 3 is an enlarged cross-sectional view of the ball bearing shown in FIG. 2.
Figure 4:
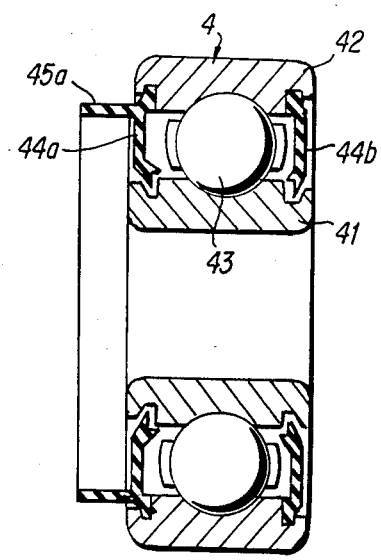
FIG. 4 is a cross-sectional view of a first embodiment of the ball bearing according to the present invention.
Figure 5:
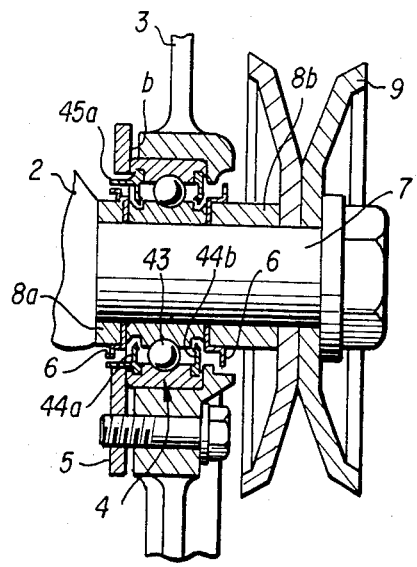
FIG. 5 is a cross-sectional view of a part of a generator with a ball bearing shown in FIG. 4.

FIGS. 4 and 5 show a first embodiment of the present invention. The rubber-sealing plates 44a, 44b of the bearing 4 respectively have their one ends firmly secured to the outer ring 42 and the other ends extending to the inner ring 41. An annular projection 45a in a cylindrical form is formed integrally with the outer surface of the rubber-sealing plate 44a at or near the outer circumferential part of the rubber-sealing plate 44a so that the inner circumferential part of the annular projection 45a faces the outer circumferential part of the sealing member 6 mounted on the rotary shaft 7 with a small gap. The structure of remaining parts of this embodiment is identical with that of FIGS. 2 and 3.

In the case that the annular projection 45a is formed in the rubber-sealing plate 44a, water entered from the gap between the front bracket 3 and retainer 5 as shown by the arrow mark b is prevented from entrance into the bearing 4 through the outer peripheral surface of the annular projection 45a because the rubber-sealing plate 44a is closely fitted to the outer ring 42 without any gap. Accordingly, there is avoided deterioration of a lubricating oil in the bearing and the life time of the bearing is prolonged.

Figure 6:
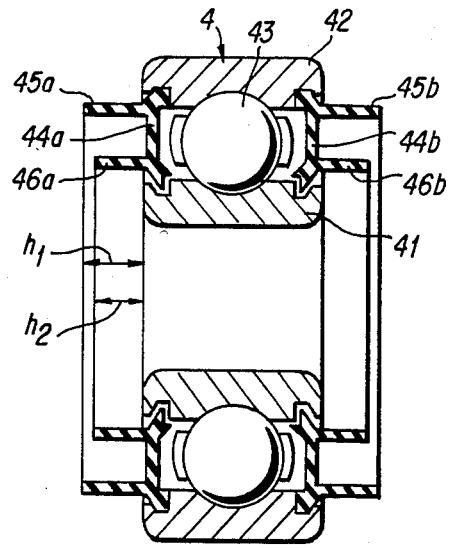
FIG. 6 is a cross-sectional view of a second embodiment of the ball bearing device according to the present invention.

In FIG. 4, description has been made as to the annular projection 45a formed only in the rubber-sealing plate 44a. However, in both the embodiment of FIGS. 4 and 5 and the embodiment of FIGS. 6 and 7, annular projections may be formed on both the rubber-sealing plate 44a and the rubber-sealing plate 44b. That is, as illustrated in FIG. 6, an annular projection 45a can be formed on the rubber-sealing plate 44a, and an annular projection 45b can be formed on the rubber-sealing plate 44b. Similarly, as shown in FIG. 8, an annular projection 45a can be formed on the rubber-sealing plate 44a, and an annular projection 45b can be formed on the rubber-sealing plate 44b. In this case, when the diameter of the annular projections 45a, 45b formed in the rubber-sealing plates 44a, 44b is the same, making the shape of the both plates identical, it is advantageous from the viewpoint of easy and economical manufacture of the plates.

Figure 7:
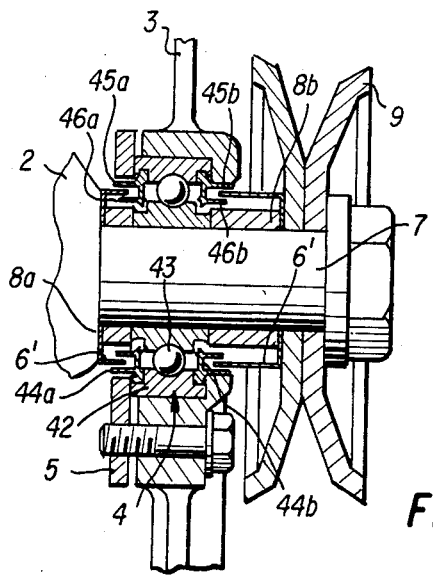
FIG. 7 is a cross-sectional view of a part of a generator with the ball bearing shown in FIG. 6.
Figure 8:
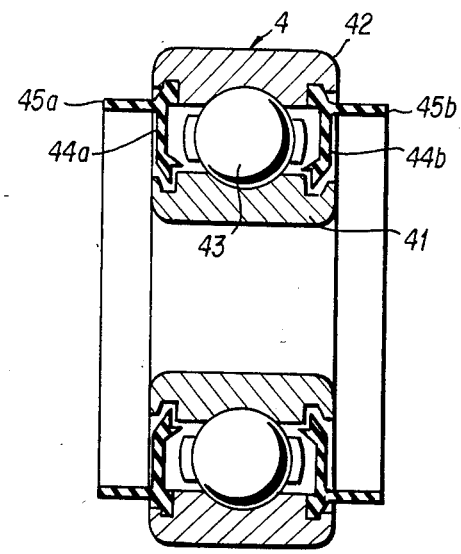
FIG. 8 is a cross-sectional view of a third embodiment of the ball bearing device according to the present invention.

FIGS. 6 and 7 show a second embodiment of the present invention. In this embodiment, a separate annular projection 46a is formed at or near the inner circumferential part of the outer surface of the rubber-sealing plate 44a in addition to the annular projection 45a formed at or near the outer circumferential part. Also annular projections 45b, 46b are respectivey formed at or near the outer and inner circumferential parts of the outer surface of the rubber-sealing plate 44b. The outer annular projections 45a, 45b and the inner annular projections 46a, 46b respectively are formed to have the same axial center and the height $h_1$ in the axial direction of the outer annular projections 45a, 45b is greater than the height $h_2$ in the axial direction of the inner annular projections 46a, 46b. Sealing plates 6' are interposed between the rotor 2 and the spacer 8a and between the spacer 8b and the pulley 9 respectively so that both ends of the annular parts of the sealing plates 6', 6' are inserted between the annular projections 45a, 46a of the rubber-sealing plate 44a and between the annular projections 45b, 46b of the rubber-sealing plate 44b. A labyrinth structure is provided on both sides of the bearing 4 by the annular projections 45a, 46a and one sealing plate 6', and the annular projections 45b, 46b and the other sealing plate 6' whereby waterproof property for preventing invasion of water into the bearing is further improved.

Figure 9:
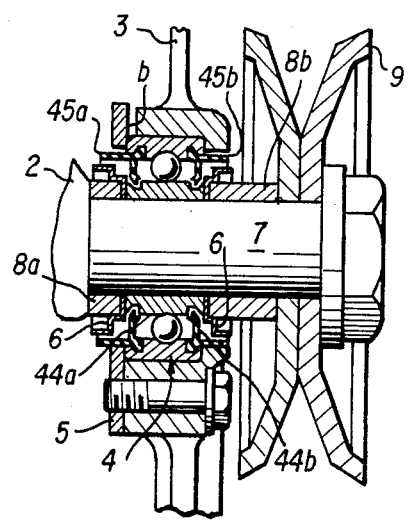
FIG. 9 is a cross-sectional view of a part of a generator with the ball bearing device shown in FIG. 8.

FIGS. 8 and 9 show a third embodiment of the present invention. The third embodiment is identical to the first embodiment except that an annular projection 45b is formed on the rubber-sealing plate 44b and that the right-hand sealing member 6 is, correspondingly, the mirror-image of the left-hand sealing member 6.

Thus, in the embodiments of the present invention, an annular projection is formed in the outer surface of at least one rubber-sealing plate of the bearing so that it covers the outer circumference of a sealing plate attached to a rotary shaft with a small gap. Accordingly water entered from the outside is prevented from entering into the bearing owing to the annular projection, whereby deterioration of a lubricating agent is minimized and the lift time of the bearing is prolonged.

Obviously, numerous modifications and variations of the present invention are possible in light of the above teachings. It is therefore to be understood that within the scope of the appended claims, the invention may be practiced otherwise than as specifically described herein.

What is claimed is:

1. A waterproof ball bearing assembly comprising:
   (a) a rotary shaft;
   (b) a ball bearing mounted on said rotary shaft, said ball bearing comprising:
      (i) an inner ring surrounding said rotary shaft;
      (ii) an outer ring surrounding said inner ring; and
      (iii) a plurality of balls held between said inner ring and said outer ring;
   (c) a first spacer mounted on said rotary shaft adjacent to said ball bearing on a first side thereof;
   (d) a first flexible waterproof seal mounted on said ball bearing on the first side of said ball bearing, said first flexible waterproof seal comprising:
      (i) an annular plate-like portion the radially outer edge of which is connected sealingly to said outer ring of said ball bearing and the radially inner edge of which is adjacent to or in resilient contact with said inner ring of said ball bearing and
      (ii) a first annular projecting portion extending axially from said annular plate-like portion radially outwardly of said first spacer; and
   (e) a first metallic sleeve seal mounted between said first spacer and said inner ring of said ball bearing, said first metallic sleeve seal comprising:
      (i) an annular plate-like portion which is in axially abutting contact with adjacent surfaces of said first spacer and said inner ring of said ball bearing;
      (ii) a first annular projecting portion extending axially from said annular plate-like portion radially outwardly of said first spacer and radially inwardly of said annular projecting portion of said first flexible waterproof seal;
      (iii) an annular collar portion extending radially outwardly from the end of said first annular projecting portion remote from said annular plate-like portion of said first metallic sleeve seal; and
      (iv) a second annular projecting portion extending axially from said annular collar portion radially outwardly of said first annular projecting portion and radially inwardly of, but closely spaced from, said annular projecting portion of said first flexible waterproof seal.

2. A waterproof ball bearing assembly as recited in claim 1 and further comprising:
   (a) a second spacer mounted on said rotary shaft adjacent to said ball bearing and on a second side thereof, axially opposite to the first side thereof;
   (b) a second flexible waterproof seal mounted on said ball bearing on the second side of said ball bearing, said second flexible waterproof seal comprising:
      (i) an annular plate-like portion the radially outer edge of which is connected sealingly to said outer ring of said ball bearing and the radially inner edge of which is adjacent to or in resilient contact with said inner ring of said ball bearing and
      (ii) a first annular projecting portion extending axially from said annular plate-like portion radially outwardly of said second spacer; and
   (c) a second metallic sleeve seal mounted between said second spacer and said inner ring of said ball bearing, said second metallic sleeve seal comprising:
      (i) an annular plate-like portion which is in axially abutting contact with adjacent surfaces of said second spacer and said inner ring of said ball bearing;

(ii) a first annular projecting portion extending axially from said annular plate-like portion radially outwardly of said second spacer and radially inwardly of said annular projecting portion of said second flexible waterproof seal;

(iii) an annular collar portion extending radially outwardly from the end of said first annular projecting portion remote from said annular plate-like portion of said second metallic sleeve seal; and (iv) a second annular projecting portion extending axially from said annular collar portion radially outwardly of said first annular projecting portion and radially inwardly of, but closely spaced from, said annular projecting portion of said second flexible waterproof seal.

* * * * *